US 9,231,998 B2

(12) United States Patent
Lu et al.

(10) Patent No.: US 9,231,998 B2
(45) Date of Patent: Jan. 5, 2016

(54) VEHICLE-SPECIFIC COMPUTATION MANAGEMENT SYSTEM FOR CLOUD COMPUTING

(71) Applicant: FORD GLOBAL TECHNOLOGIES, LLC, Dearborn, MI (US)

(72) Inventors: Jianbo Lu, Northville, MI (US); Dimitar P. Filev, Novi, MI (US); Davor D. Hrovat, Ann Arbor, MI (US); John O. Michelini, Sterling Heights, MI (US); Imad H. Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 235 days.

(21) Appl. No.: 14/160,779

(22) Filed: Jan. 22, 2014

(65) Prior Publication Data
US 2015/0207859 A1 Jul. 23, 2015

(51) Int. Cl.
*G06F 15/16* (2006.01)
*H04L 29/08* (2006.01)

(52) U.S. Cl.
CPC ............... *H04L 67/10* (2013.01); *H04L 67/12* (2013.01)

(58) Field of Classification Search
CPC .. H04L 67/10; G06F 11/0709; G06F 11/2007
See application file for complete search history.

(56) References Cited

U.S. PATENT DOCUMENTS

| | | |
|---|---|---|
| 8,380,880 B2 | 2/2013 | Gulley et al. |
| 8,467,324 B2 | 6/2013 | Yousefi et al. |
| 2003/0216889 A1* | 11/2003 | Marko ............... G07C 5/0808 702/182 |
| 2010/0064362 A1* | 3/2010 | Materna ............. H04L 63/1433 726/15 |
| 2010/0238840 A1 | 9/2010 | Lu et al. |
| 2011/0138050 A1 | 6/2011 | Dawson et al. |
| 2011/0238458 A1 | 9/2011 | Purcell et al. |
| 2012/0066670 A1 | 3/2012 | McCarthy et al. |
| 2012/0089426 A1 | 4/2012 | Borucki |
| 2012/0253551 A1 | 10/2012 | Halimi et al. |
| 2012/0317215 A1* | 12/2012 | Brunner ............. G06Q 10/107 709/206 |
| 2013/0036217 A1 | 2/2013 | DeJana et al. |
| 2013/0304863 A1* | 11/2013 | Reber .................. G06F 1/3203 709/218 |
| 2014/0201263 A1* | 7/2014 | Ohashi ............. H04L 29/06047 709/203 |
| 2014/0365442 A1* | 12/2014 | Subramanian ......... G06Q 10/06 707/661 |
| 2015/0010153 A1* | 1/2015 | Robertson ............ H04W 12/02 380/270 |
| 2015/0160029 A1* | 6/2015 | Kobayashi .......... G01C 21/3469 701/32.3 |

OTHER PUBLICATIONS

D. Filev, J. and D. Hrovat, "Future Mobility: Integrated Vehicle Control with Cloud Computing," ASME Dynamic System & Control Magazine, No. 1, vol. 1, pp. 18-24, 2013 (inaugural issue).

* cited by examiner

*Primary Examiner* — Peling Shaw
(74) *Attorney, Agent, or Firm* — Gregory P. Brown; MacMillan, Sobanski & Todd, LLC

(57) ABSTRACT

A vehicle control and computation system interfaces a task controller in the vehicle with a vehicle-specific computation manager in a cloud network. A wireless data channel couples the task controller and the cloud network. The task controller performs operational tasks in the vehicle using data-related resources in the cloud network. Upon initiating one of the operational tasks, the task controller sends a handshake signal to the computation manager as a resource request. The computation manager calls at least one cloud-based agent from a database of predetermined agents in response to the handshake signal. The task controller completes the operational task via communication with the called agent.

11 Claims, 3 Drawing Sheets

VEHICLE-SPECIFIC COMPUTATION MANAGEMENT SYSTEM FOR CLOUD COMPUTING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive applications using cloud computing, and, more specifically, to the interface between a vehicle and cloud computing resources.

Onboard vehicle computing devices (e.g., microprocessor-controlled electronic modules such as powertrain controllers, driver information systems, and entertainment systems) are generally limited to relatively low processing power of vehicle computers, small data storage, and lack of easy access to programming updates or other data that is created after the vehicle is put into service. Advances in mobile connectivity between vehicles and an off-board computational cloud infrastructure are beginning to enable new classes of electronic features that are not limited in this way.

The wireless connection available for wireless vehicle communication is often characterized by variable bandwidth, variable latency, and sporadic availability. The typical in-vehicle computer or electronic control unit (ECU) is characterized by high reliability, high durability, hard real-time response, low processing power and very small memory (particularly non-volatile memory). The ECU is mobile, lasts the life of the vehicle, and is part of the vehicle purchase. Data created in the ECU tends to be related to events that have happened in the past on very short time scales. In contrast, cloud computers are characterized by high-reliability, high-computational power, large memory and (from the perspective of the vehicle) lack of real-time response. They are stationary, managed systems that are replaced frequently and operate on a lease, own, or fee-for-use basis. Data created in the cloud tends to have a forecast nature that tells what can be expected sometime into the future, rather than what has happened in the past.

While an onboard, networked control architecture remains the dominant approach for safety critical and real-time functionalities, cloud-computing applications can provide enhanced automotive control/adaptation and new functionalities. For example, cloud computing can provide resource intensive services to achieve leaner, safer, smarter, greener, and more enjoyable automotive operations.

Cloud computing is a model for enabling network access to a shared pool of configurable computing resources that have virtually unlimited storage space and essentially unlimited computational power. Areas in which cloud computing offers improved vehicle performance and driver convenience include dealing with traffic congestion, route planning, adapting target speeds to road and traffic conditions, calibrating vehicle systems (e.g., active suspension) to changing environmental conditions, and many others.

Access to cloud resources needs to be rapidly provisioned and released with minimal management effort or service provider interaction. The operational interfacing and computational management for accessing cloud resources should be optimized to the relative limitations and strengths of the two processing environments.

SUMMARY OF THE INVENTION

The invention provides a computation management system for supervising and implementing computation-related tasks using cloud resources, in a manner that efficiently meets the demands of real-time communication between in-vehicle networks and the cloud server, the calling of on-demand agents (e.g., running and releasing), on-line and off-line computing and storage, frequent computation cycles (e.g., starting, running, and ending), information processing (e.g., classifying, sharing, storing), and robust and reliable operation and communication.

The complexity of the computations can be managed through different combinations of priorities and demands. The local computations conducted in the in-vehicle networks range from being simple (demanding less computational resources) to complex (demanding more computational resources). The same is true for the remote computations conducted in the cloud computing servers (CCS), resulting in the following possible combinations:

conducting simple computations in the local ECUs with a fast sampling rate and utilizing available CCS data to enhance local computations at a slow sampling rate, resulting in a local-simple-remote-simple (LSRS) strategy, conducting simple computations in the local ECUs with a fast sampling rate and outsourcing complex computations to the CCS for cloud computing agents to handle at a slow sampling rate, resulting in a local-simple-remote-complex (LSRC) strategy, conducting complex computations that are compatible with the capability of the current ECUs at a fast sampling rate and utilizing available CCS data to enhance local computations at a slow sampling rate, resulting in a local-complex-remote-simple (LCRS) strategy, and conducting complex computations that are compatible with the capability of the current ECUs at a fast sampling rate and outsourcing even more resource-demanding computations to the CCS for the cloud computing agents to handle at a slow sampling rate, resulting in a local-complex-remote-complex (LCRC) strategy.

The computation management system of the invention distributes computational tasks according to the corresponding complexity that needs to be accommodated.

For each respective task initiated onboard the vehicle that depends on any interaction with the cloud resources, a respective software entity known as an agent may be deployed in the cloud. The agents exemplify the benefits of integrating cloud computing with vehicle controls. The agents may generally perform tasks according to three main groups: service, supervisory, and crowdsourcing. Service agents deal primarily with data management, and they focus on handling, organizing, summarizing, and storing information in the CCS. Supervisory agents expand the capability of onboard vehicle controls by executing broad control tasks that require significant computational resources and that are not suitable for onboard implementation, e.g., learning driver models, estimating vehicle states, calculating optimal speed profile along a specified route, real-time control calibrations, etc. The crowdsourcing agents gather and summarize information from multiple vehicles, fuse this information with other cloud information sources (e.g., weather conditions, traffic updates, geographical data) and estimate the states of groups of vehicles, such as characterizing current traffic and road conditions at a specific location.

In one aspect of the invention, a vehicle control and computation system comprises a task controller in the vehicle and a vehicle-specific computation manager in a cloud network. A wireless data channel couples the task controller and the cloud network. The task controller performs operational tasks in the vehicle using data-related resources in the cloud network. Upon initiating one of the operational tasks, the task controller sends a handshake signal to the computation manager as a resource request. The computation manager calls at least one cloud-based agent from a database of predetermined agents in response to the handshake signal. The task controller completes the operational task via communication with the called agent.

DETAILED DESCRIPTION OF PREFERRED EMBODIMENTS

Figure 1:
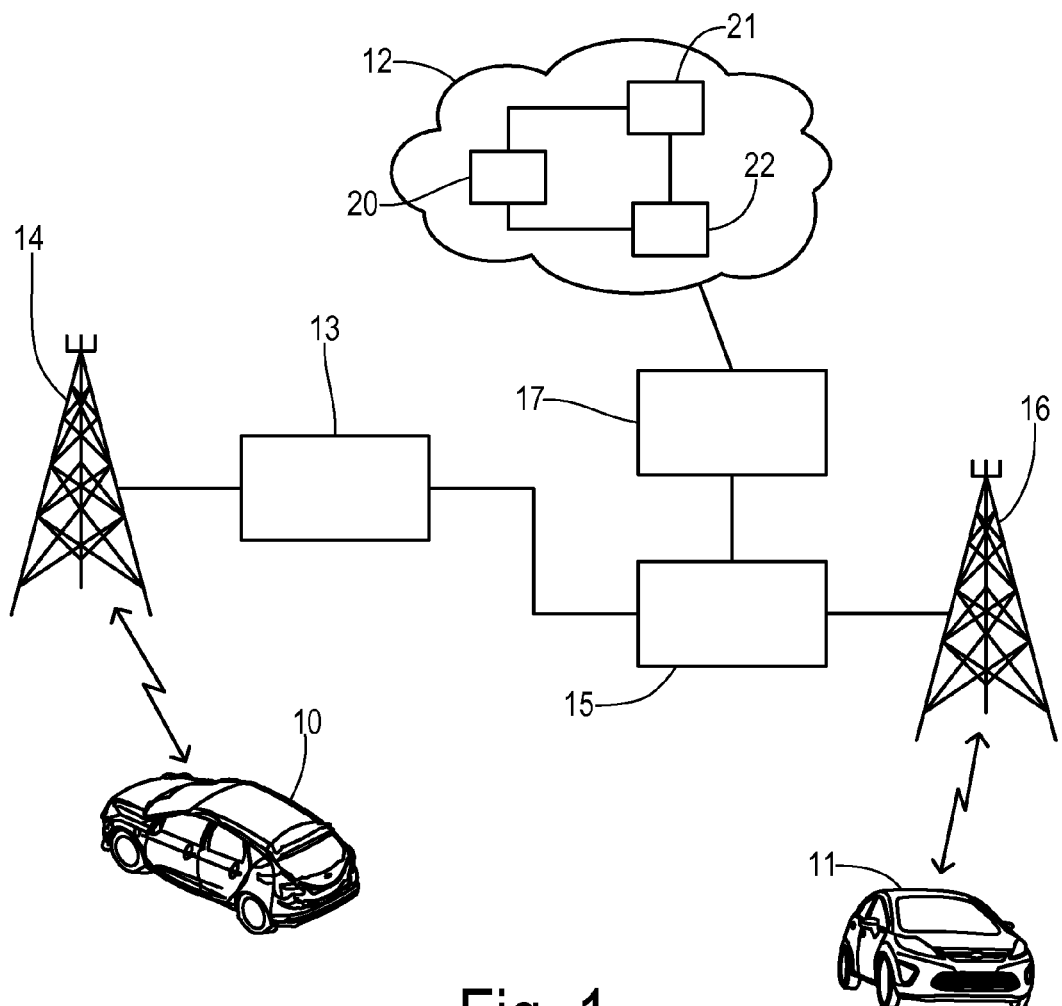
FIG. 1 is a diagram showing vehicle communication with cloud resources over a wireless communication system.

FIG. 1 shows a cloud computing system wherein vehicles 10 and 11 communicate wirelessly with cloud resources 12 via a data communication system based on a mobile, cellular communication system. Vehicle 10 communicates with a cellular carrier network 13 via a cellular tower 14, and vehicle 11 communicates with a cellular provider network 15 via a cellular tower 16. Provider networks 13 and 15 are interconnected. Cloud resources 12 are coupled to the cellular networks via a gateway 17. Cloud 12 may include any arbitrary collection of resources including a plurality of servers 20-22.

Figure 2:
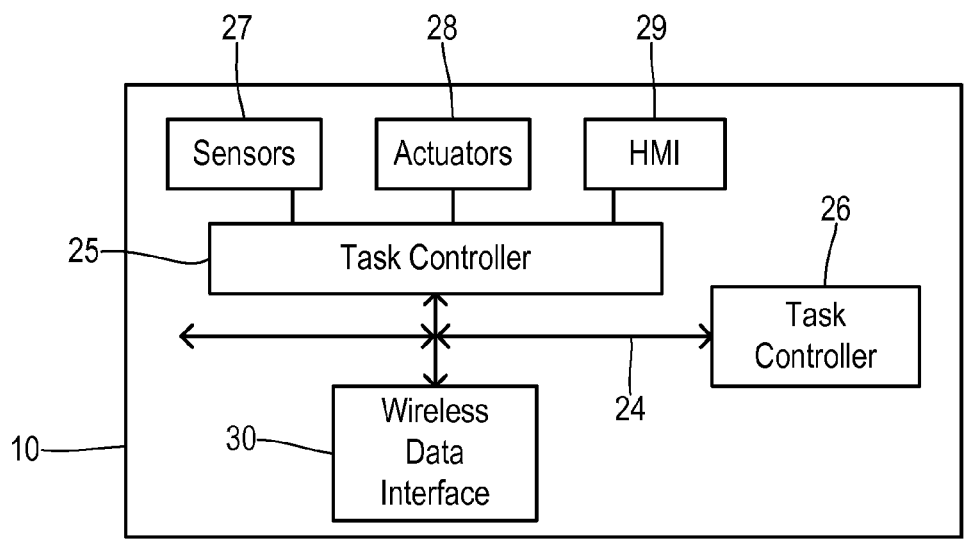
FIG. 2 is a block diagram showing vehicle systems according to an embodiment of the invention.

FIG. 2 shows a generic computing architecture within vehicle 10 wherein computing resources are distributed among a plurality of electronic modules including a task controller 25 and task controller 26. Each task controller in vehicle 10 may interact with respective sensors 27, actuators 28, and human machine interface (HMI) 29, for example. Task controllers 25 and 26 are interconnected by an in-vehicle interface or communication bus 24 is known in the art. A wireless data interface 30 is coupled to task controllers 25 and 26 via bus 24 to establish a wireless data channel coupling the task controllers to the cloud network.

Figure 3:
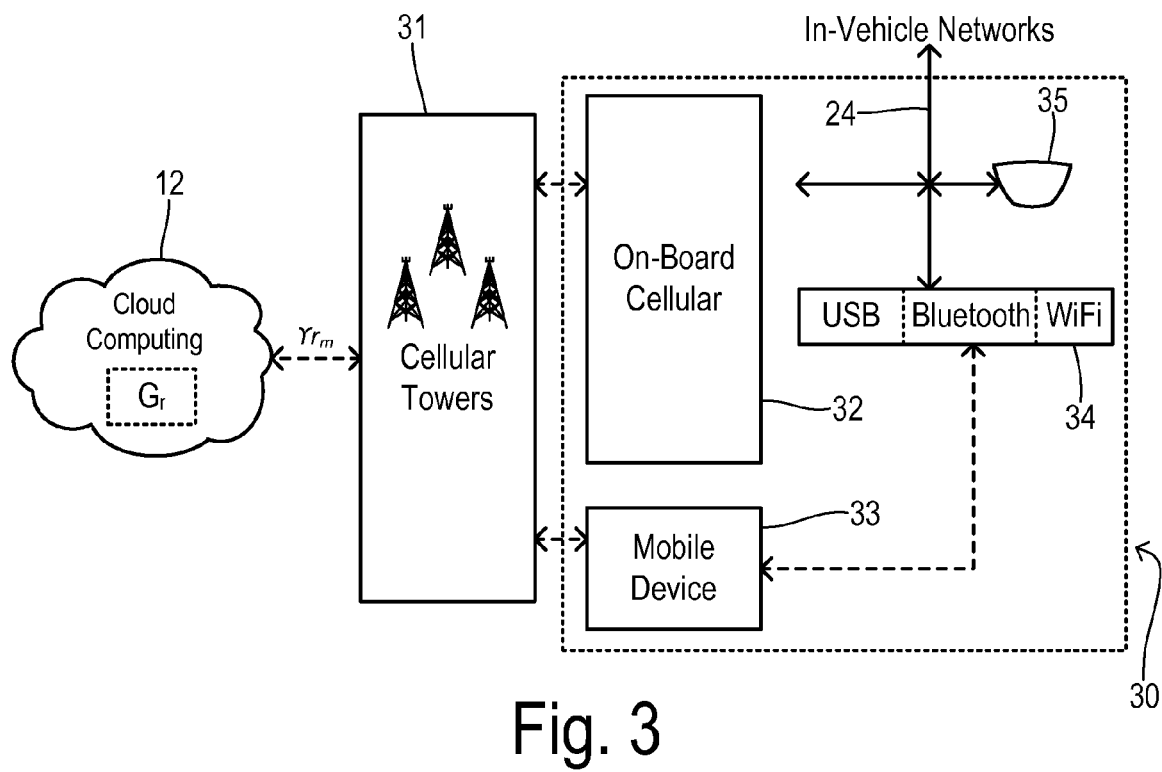
FIG. 3 is a block diagram showing a communication channel in greater detail.

The wireless data channel is shown in greater detail in FIG. 3 wherein a plurality of different communication technologies can be employed to help ensure maximum connectivity between the vehicle and the cloud resources. Cloud computing network 12 is coupled to a cellular network 31 including cellular towers for wireless data exchange with an onboard cellular modem 32 and/or a driver's mobile device 33 to carry network communication packets to and from in-vehicle networks via bus 24. The vehicle-installed wireless data interface 30 may include a communication port 34 extending the communication capability to Wi-Fi, Bluetooth, and USB-connected devices. Furthermore, a hard-wired communication port 35 can be provided for other types of network communication modes such as Ethernet.

Figure 4:
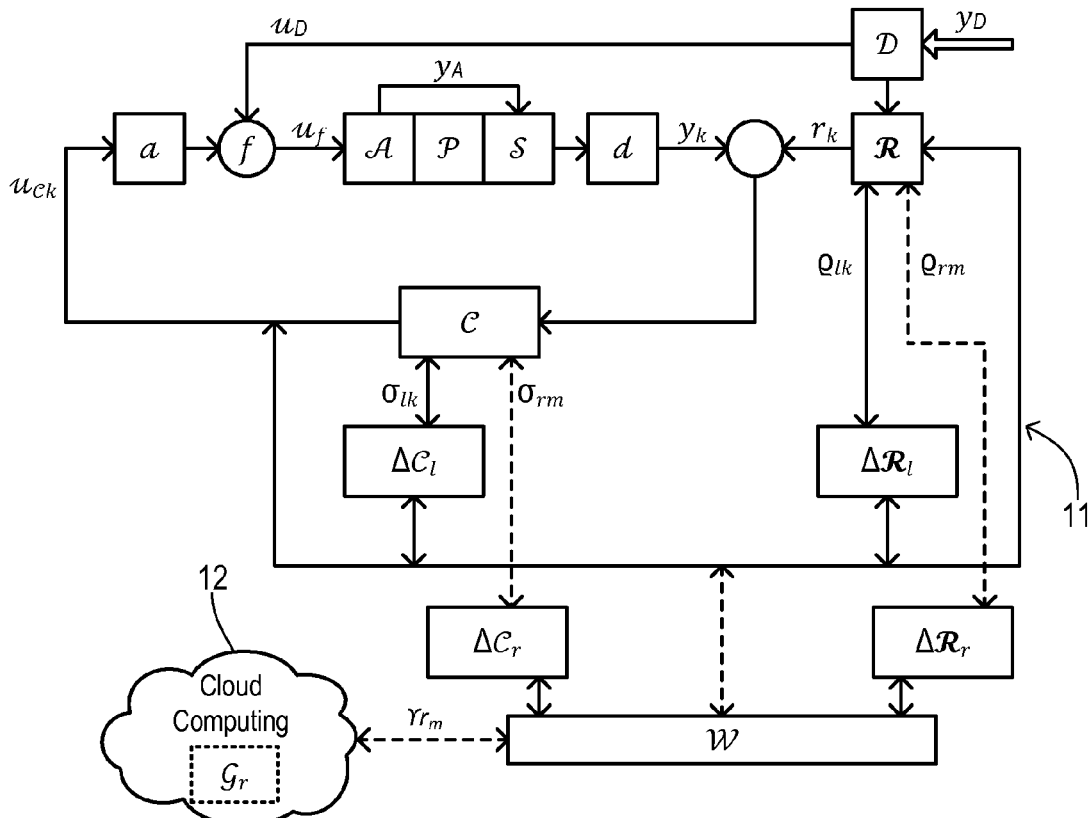
FIG. 4 is a model showing the various functional elements of the vehicle/cloud-computing environment of the invention.

FIG. 4 shows a vehicle-cloud interface model, wherein $\mathcal{A}$ denotes the collection of all the relevant actuators in the vehicle, $\mathcal{P}$ is the vehicle plant, $\mathcal{S}$ is the is collection of all sensors, and $\mathcal{C}$ is the collection of all the controllers. Further, $\mathcal{D}$ represents the driver, and $\mathcal{R}$ denotes the references. $\Delta\mathcal{C}_l$ is the incremental control generated from local vehicle measurements, $\Delta\mathcal{C}_r$ is the incremental control generated from both the local and cloud information, $\Delta\mathcal{R}_l$ is the incremental reference generated from local vehicle measurements, and $\Delta\mathcal{R}_r$ is the incremental references generated from both local and cloud information. $\mathcal{W}$ represents the wireless communication devices. $\mathcal{G}_r$ is the collection of the data storage, data processing, computing, and software units in cloud 12. $u\mathcal{C}_k$ denotes the digital control signal generated from controllers $\mathcal{C}$, which passes through a digital-to-analog converter a before commanding the actuator $\mathcal{A}$. $u_D$ represents the driver's control commands that are influenced by i) unknown information denoted $y_D$ as observed by the driver, ii) $y_A$, which is the senor measurements of the actuators, iii) $y_k$, which is the digital sensor measurements by passing the outputs of $\mathcal{S}$ through analog-to-digital converter d, and iv) $r_k$, which is the reference signal. $g_{l_k}$ represents the signal communicated between $\mathcal{R}$ and $\Delta\mathcal{R}_l$. $g_{r_m}$ is the signal communicated between $\mathcal{R}$ and $\Delta\mathcal{R}_r$, and $\sigma_{l_k}$ is the signal communicated between $\mathcal{C}$ and $\Delta\mathcal{C}_l$. $\sigma_{r_m}$ is the signal communicated between $\mathcal{C}$ and $\Delta\mathcal{C}_r$, $\gamma_{r_m}$ is the signal communicated between $\mathcal{W}$ and $\mathcal{G}_r$.

The complexity of computations to be conducted in or for a vehicle that is operating together with a cloud server is very different from the typical onboard computations that have been conducted conventionally in local, self-contained ECUs in a vehicle. In conventional onboard architectures, ECUs have mainly conducted computations independently and with minimal information being shared through in-vehicle networks, such as CAN. All the computational powers have been dedicated to individual ECUs, and it has been impossible to switch the service objects of ECUs. In cloud computing of the present invention, a cloud server is dynamically scalable and adaptable, creating a virtual ECU that has unlimited computational power and unlimited storage space. Such an "extended" ECU can potentially be adapted to serve any vehicle and perform any desired functions. The computational needs for each vehicle or the implemented functions of each vehicle can be managed through various combinations of priorities, arbitration, supervision, and cycling.

Figure 5:
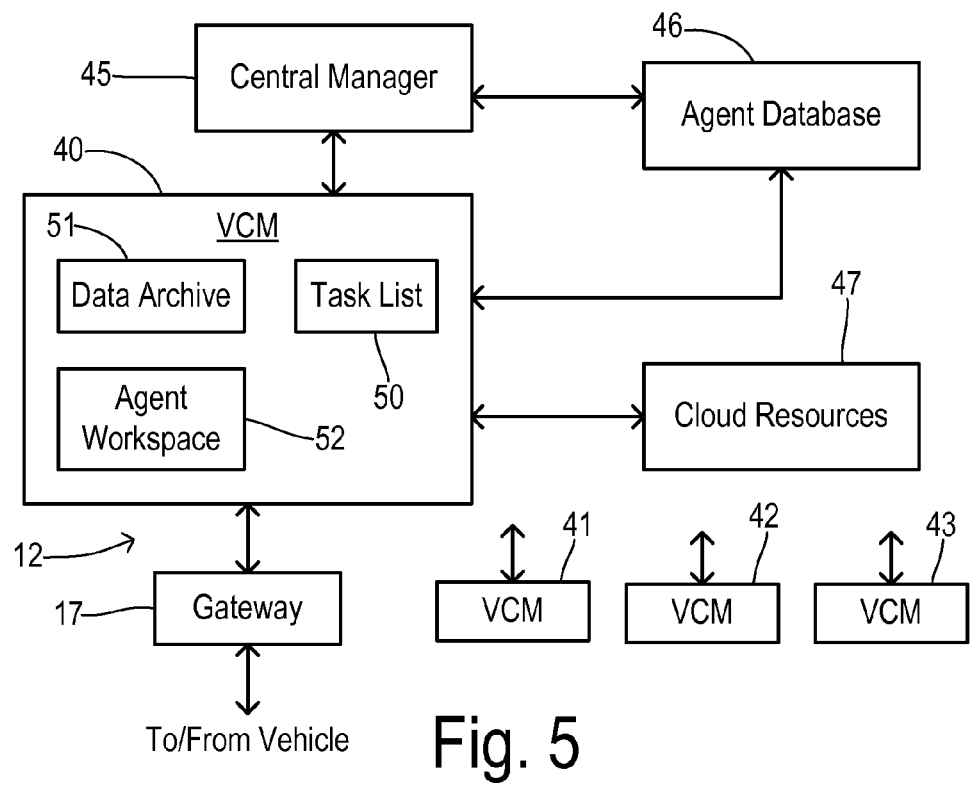
FIG. 5 is a block diagram of a computation management system according to an embodiment of the invention.

FIG. 5 shows one preferred embodiment for a computation management system deployed within cloud network 12. For each particular vehicle authorized to use a particular cloud computing server system, a separate vehicle-specific computation manager (VCM) 40-43 is provided. Internal details and other cloud network connections are shown only for VCM 40.

VCM 40 is connected to a central manager 45 through which a service provider exercises master control over all the VCMs. Center manager 45 and VCM 40 are coupled to an agent database 46 wherein a plurality of predetermined agents are stored which have been previously developed in order to perform predefined tasks that are being made available to individual vehicles. Each agent is configured to be called (i.e., invoked) by a respective VCM in order to achieve a respective task which may, when necessary, communicate with or use additional cloud resources 47.

VCM 40 (which is dedicated to a particular individual vehicle) includes a task list 50, a data archive 51, and an agent workspace 52 for managing and executing operational tasks defined by vehicle requests that invoke data-related resources of cloud network 12. Task list 50 is used to keep track of multiple simultaneous resource requests that have been initiated by a corresponding vehicle, so that the simultaneous tasks can be prioritized according to predefined criteria. Archive 51 stores vehicle-specific information to support operational tasks that may employ historical data. Agent workspace 52 is maintained in order to support the creation of individual instances of the predefined agents being invoked to respond to vehicle requested operational tasks.

According to the invention, when any one of the task controllers within a vehicle initiates an operational task that invokes an interaction with the cloud-computing resources, a handshake signal is generated for sending to the vehicle-specific computation manager (VCM) in the cloud. The handshake signal may have the following structure.

| Handshake Signal | | |
|---|---|---|
| Byte | | Byte Value and Meaning |
| 0 | 0 | No requests from local ECUs and cloud. No communication between cloud and local ECUs. |
| 1 Communication request | 0 | Inactive |
| | 1 | Local ECUs requesting cloud data, cloud not needing data from local ECUs (used for LSRS or LCRS). |
| | 2 | Cloud needing local ECU info, local ECUs not requesting data from cloud. |
| | 3 | Local ECU and cloud exchanging data. |
| 2 Data storage request | 0 | Inactive |
| | 1 | Local ECUs sending data to cloud and requesting cloud to store data in specified categories. |
| | 2 | Local ECUs sending data to cloud and requesting cloud to store data in unspecified categories (cloud need to determine where to store). |
| 3 Computation request | 0 | Inactive |
| | 1 | Local ECUs requesting cloud to conduct certain computation based on cloud data. |
| | 2 | Local ECUs sending data to the cloud and requesting cloud to provide certain computation based on local ECUs data alone. |
| | 3 | Local ECUs sending data to the cloud and requesting cloud to provide certain computation based on both local ECUs data and cloud data. |
| | 4 | Local ECUs and cloud to have dynamic data exchanges, namely computation depends on data exchange at each time step. |
| 4 Crowdsourcing request | 0 | Inactive |
| | 1 | Cloud needing local ECUs to send vehicle data that is needed for cloud sourcing purpose. |
| | 2 | Local ECUs sending event-based data to cloud and requesting cloud to use the event-driven data for crowdsourcing purpose. |
| 5 to End Data Payload | — | Payload of any length. Can include name or ID of specific agent(s) to be called and/or vehicle data to support requested tasks. |

Figure 6:
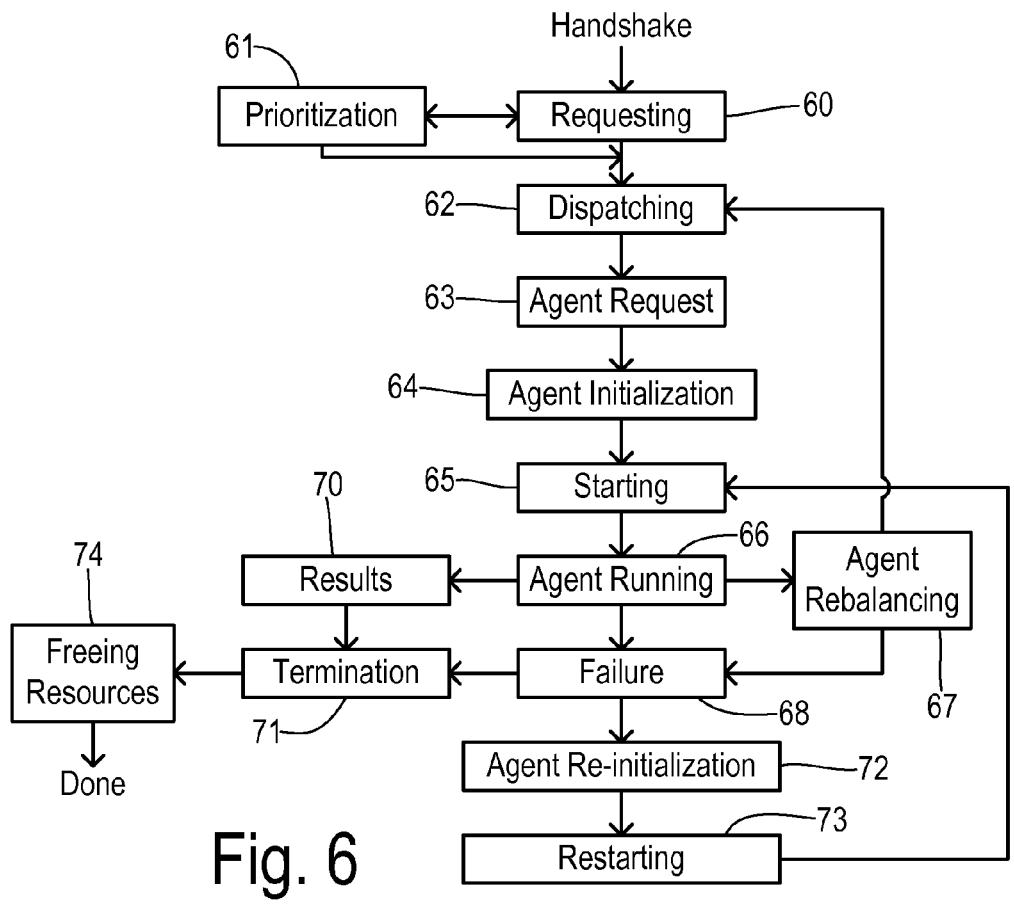
FIG. 6 is a block diagram showing computation management tasks for the system of FIG. 5.

FIG. 6 shows one preferred embodiment of interfacing tasks to be performed by the vehicle-specific computation manager in response to an incoming handshake signal that is transmitted by a task controller in the vehicle upon initiating one of its operational tasks that requires assistance from the cloud resources. Thus, a requesting task 60 is initiated in the VCM in order to parse and analyze the contents of the handshake signal. In the event that a single request includes multiple agents to be called, or in the event that one or more agents for other operational tasks have already been called and are currently executing in the agent workspace of the VCM, then a prioritization task 61 prioritizes execution and communication functions in connection with the respective agents (e.g., based on predefined priority rankings or dynamically determined function availability). As a result of the prioritization, the task list maintained by the VCM is populated with information defining which agents will be called, the time when they will be called, and the location for finding or storing data used by the agents, together with information defining the desired results and any particular locations where the computational results are to be stored.

Using the task list, a dispatching task 62 is performed to identify and locate prototype instances of the desired agent or agents within a central agent database maintained within the cloud computing network. In an agent request task 63, the identified agent prototypes are retrieved and transferred to the agent workspace of the VCM, at which point each task is called by the computation manager. Upon being called, an agent initialization task 64 is performed wherein the initial data and/or other task-related conditions needed by each specific agent are initialized via the computation manager. Initialization can be conducted through several mechanisms, such as a) using average values of the involved variables as measured or computed onboard the vehicle, b) average values of the involved variables determined from crowdsourcing data, or c) historical data of the involved variables as stored in the data archive within the vehicle-specific computation manager.

After initialization, the agent or agents use the vehicle or cloud data to conduct the target computation(s) in a starting task 65. For starting task 65, all inputs, data, and necessary computation models are assembled together in the specific working space as necessary to support the operational task(s) identified from the original handshake signal.

Formal running of the called agent or agents is conducted at agent running task 66. Potential outcomes of running of the agents includes either in agent rebalancing task 67, a failure task 68, or a results task 70. In rebalancing task 67, dynamically changing agents may be replaced as a result of changing conditions of the vehicle (e.g., where changing conditions necessitate use of a different set of inputs in order to perform the desired operational task). Thus, if a need for rebalancing is is detected a return is made to dispatching task 62 to re-identify another agent which is then retrieved, initialized, and started.

In the event that running task 66 results in an error or other failure to produce the desired result, then failure task 68 checks to determine whether or not the operational task can be successfully performed in view of the current conditions. If not, then a termination task 71 is performed. Otherwise, the existing instance of the agent is reinitialized in agent re-initialization task 72 and then restarted at restarting task 73 before returning to tasks 65 and 66.

If successful results are obtained at results task 70, then the result is formatted for transmitting back to the task controller in the vehicle, with the results potentially being prioritized for transmission with respect to other ongoing processes involving the same vehicle. After delivery of the results, the termination task 71 is performed including a freeing of the associated resources (e.g., in the agent workspace and task list) at task 74. Once the associated resources are freed, the computation manager is done with respect to the associated operational task.

What is claimed is:

1. A vehicle control and computation system, comprising:
   a task controller in the vehicle;
   a vehicle-specific computation manager in a cloud network; and
   a wireless data channel coupling the task controller and the cloud network;

wherein the task controller performs operational tasks in the vehicle using data-related resources in the cloud network;

wherein, upon initiating one of the operational tasks, the task controller sends a handshake signal to the computation manager as a resource request;

wherein the computation manager calls at least one cloud-based agent from a database of predetermined agents in response to the handshake signal; and wherein the task controller completes the operational task via communication with the called agent.

2. The system of claim 1 wherein the computation manager maintains a task list and a long term data archive corresponding to the vehicle.

3. The system of claim 2 wherein the computation manager receives a plurality of overlapping resource requests from the vehicle, and wherein the computation manager performs a Prioritization task to prioritize each received resource request with respect to the task list and to adjust execution of a called agent according to the prioritization.

4. The system of claim 2 wherein the computation manager performs an Initialization task when calling the called agent to set initial data and conditions used by the called agent.

5. The system of claim 4 wherein the initial data and conditions include contents of the handshake signal.

6. The system of claim 4 wherein the initial data and conditions include contents of the data archive.

7. The system of claim 4 wherein the initial data and conditions include crowdsourced data stored in the cloud network.

8. The system of claim 1 wherein the computation manager performs a Rebalancing task to halt a called agent and to re-identify a replacement agent in response to changing conditions of the vehicle.

9. The system of claim 1 wherein the computation manager performs a Results task to send results to the task controller in response to a successful operation is by the called agent.

10. The system of claim 9 wherein the computation manager performs a Failure task in response to unsuccessful operation of the called agent, wherein the Failure task includes a re-initialization to reset initial data and conditions used by the called agent and re-starting of the called agent.

11. The system of claim 10 wherein the computation manager performs a Termination task to release the called agent and the data-related resources after 1) performing the Results task, or 2) inability of the Failure task to re-start the called agent.

* * * * *